United States Patent [19]

Branch

[11] Patent Number: 4,644,880
[45] Date of Patent: Feb. 24, 1987

[54] METHOD AND APPARATUS FOR TRANSPLANTING CORPS

[75] Inventor: Gregory L. Branch, Salinas, Calif.

[73] Assignee: Growers Transplanting, Inc., Salinas, Calif.

[21] Appl. No.: 704,569

[22] Filed: Feb. 22, 1985

[51] Int. Cl.[4] .............................................. A01C 11/00
[52] U.S. Cl. ........................................................ 111/3
[58] Field of Search ........................................ 111/2, 3

[56] References Cited

U.S. PATENT DOCUMENTS

| | | | |
|---|---|---|---|
| 2,475,078 | 7/1949 | Cherry | 111/3 X |
| 3,446,164 | 5/1969 | Huang et al. | 111/3 |
| 3,712,252 | 1/1973 | Huang | 111/2 |
| 3,820,480 | 6/1974 | Blackmore et al. | 111/2 |
| 3,894,589 | 7/1975 | Ciraud | 111/2 X |
| 3,923,332 | 12/1975 | Shirouzu | 111/2 X |
| 4,133,274 | 1/1979 | Orth et al. | 111/2 |
| 4,182,247 | 1/1980 | Talbott | 111/3 |
| 4,186,671 | 2/1980 | Huang | 111/2 |
| 4,294,179 | 10/1981 | Cayton et al. | 111/3 |
| 4,388,035 | 6/1983 | Cayton et al. | 111/2 X |
| 4,408,549 | 10/1983 | Qvarnstrom | 111/2 |
| 4,440,101 | 4/1984 | Edwards et al. | 111/2 |
| 4,459,924 | 7/1984 | Hassan et al. | 111/2 |

Primary Examiner—James R. Feyrer
Assistant Examiner—Danton DeMille
Attorney, Agent, or Firm—Kolisch, Hartwell & Dickinson

[57] ABSTRACT

Apparatus for automatically transplanting seedlings from cells in a seedling tray having open bottoms into a crop row in the ground of a field includes a vehicle operable for travel over the field, an opener shoe for creating a seedling-receiving furrow in the ground, a carriage mounted on the vehicle for receiving the seedling tray, a plant setter mechanism operable for controllably displacing a seedling from the seedling tray and depositing it in the furrow, wherein the plant setter mechanism includes an elongate impaler dimensioned for insertion through the upper surface of the seedling to hold it internally, the plant setter mechanism also including a displacement device for displacing the seedling in a substantially vertical orientation into the ground and a soil-packing device mounted on the vehicle operable for laterally redirecting soil from the furrow toward a deposited seedling so as to pack soil therearound.

22 Claims, 16 Drawing Figures

METHOD AND APPARATUS FOR TRANSPLANTING CORPS

BACKGROUND AND SUMMARY OF THE INVENTION

The present invention relates to agriculture and agricultural machinery, and more particularly to a novel, improved method and apparatus for transplanting crops in the field. Specifically, the invention disclosed here enables precise, controlled transplanting of seedlings from greenhouse trays. "Seedling" as used herein is used as employed in the field, and refers to the seedling plant as well as the mass of earth that the plant's roots permeate, this earth mass and roots being referred to as a ball or plug.

Transplanting row and vegetable crops has been found to be an effective agricultural process for so-called row crops, such as celery, tomatoes, broccoli, brussel sprouts, cauliflower, lettuce, peppers, beets, asparagus, etc. With respect to high density crops, those in which between 30,000 to 45,000 plants per acre are planted, it has become very advantageous to provide some type of agricultural machine or apparatus for the transplanting process. One type of transplanting method and apparatus is disclosed in Talbott, U.S. Pat. No. 4,182,247. That patent discloses a vehicle which is transportable over a field, and it includes a carriage reciprocally shiftable relative to the length of the vehicle's frame.

Incorporated on the carriage are a plurality of fluid-dispensing nozzles which are operable for injecting fluid jets into the ground to form cavities for receiving seedlings. The vehicle is pulled behind a tractor and the carriage is maintained substantially stationary relative to the ground during the fluid injection step with the vehicle being continuously advanced. After the seedling-receiving cavities are formed, seedlings are manually introduced thereinto. The vehicle includes seats and a support for holding seedling trays so that an individual or individuals may be seated on the vehicle, and during transport over a field, may remove the seedlings manually from a seedling tray and place them into the pre-formed cavities.

An automatic method and apparatus for transplanting crops is disclosed in an invention of Talbott, pending application Ser. No. 493,992 filed on May 12, 1983. In that application, there is disclosed a transplanting apparatus which receives trays of seedlings from a greenhouse and sequentially displaces the seedlings from the trays into selected crop rows via an automatic process. The method and apparatus disclosed in that application also utilized a plurality of fluid dispensers mounted on the transplanting apparatus selectively operable for directing fluid against the ground to form a plurality of laterally spaced-apart plant-receiving cavities.

The fluid dispensers are positioned in advance of a carriage which is provided on the apparatus for receiving a plurality of seedling trays. The carriage is provided with plant setters thereon selectively operable for engaging selected seedlings in selected rows of the seedling trays and displacing them substantially vertically downwardly from a selected cell in the seedling tray into a plant-receiving cavity. The application discloses a carriage which, during operation of the plant setters, moves rearwardly along the apparatus, at a rate equal to the forward travel of the apparatus so that the plant setters may be actuated to dislodge a plant from a cell and urge it vertically downwardly into a plant-receiving cavity.

The above transplanting methods and apparatus have been found to work efficiently, but the use of injecting a fluid into the ground to form a crop-receiving cavity has certain limitations, e.g., when the ground is very hard, compact or of clay-like material, etc. It has been found that a trouble-free method to create crop-receiving cavities, for the transplanting of seedlings, can be most efficiently formed by use of conventional shoes or "openers," which are small plows, for opening up the ground to create a furrow for receiving transplanted seedlings. However, such conventional devices use complicated mechanisms to transfer or deposit seedlings into the furrows created, and a continuing problem resides in the unavailability of a method to pack soil around the transplanted seedling so that it is held firmly in place after the transplanting process. Prior art transplanters, which utilize shoes to create furrows, incorporate complicated devices to hold the seedling while dirt is directed around the seedling by compaction wheels, etc. Methods for keeping the plants upright include arrangements for either holding the seedling by its leaves or by the "root ball" externally.

In machines where the leaves are held, there is no assurance that the root ball will be placed or oriented upright in the furrow. If the seedling is not transplanted upright, it may grow in a deformed manner, and will not mature at a rate consistent with other seedlings in the field, resulting in an uneven harvest.

Machines incorporating retaining devices to hold the root ball externally, such as rods or wires which grip the outside of the plant, or various types of wires which move along with the machine to hold the plant upright, suffer from drawbacks. Specifically, as the soil is compacted around the plant, the devices become jammed with the soil or become impeded so that they are damaged or cannot be retracted. Moreover, if the soil contains lumps or "clods," the wires used to hold the root ball upright prevent the soil from packing around the seedling, and therefore the seedling is not transplanted securely in place.

With the above deficiencies in the prior art in mind, it is a general object of the present invention to provide a method and vehicular apparatus for transplanting seedlings which incorporates the steps of creating a seedling-receiving furrow in the ground, displacing a seedling from a tray mounted on the apparatus and depositing it vertically downwardly into the furrow; thereafter the seedling is held substantially vertically upright by a plant setter mechanism while soil is closed back or packed around the seedling. After complete packing has occurred, the plant setter mechanism is actuated to release its hold on the seedling. The key objective is to maintain the seedling upright, during the soil-packing step, otherwise the soil will knock or kick the plant over.

Another object of the present invention is to provide a plant setter mechanism which is operable for controllably displacing a seedling from a first location, such as from a seedling tray, and depositing it at a second location such as the furrow created by the shoe. To this end, an objective of the present invention is to provide an elongate impaling means or "spear" which is dimensioned for insertion into a seedling, when the seedling is in the tray, and a seedling displacement means defined by an elongate sleeve dimensioned for coaxially and freely receiving the impaling means therethrough which engages the upper surface of the seedling. A link means is provided for transferring motion from a pneumatic device, such as a pneumatically-operated rod and cylinder, to the displacement means only after the impaling means has been extended for penetration into the seedling a predetermined distance. Thus, the impaling means orients the seedling substantially vertically during its downward descent by the displacement means, and holds it in that position during the entire soil-packing sequence. Upon completion of that step, the link means ensures that the impaling means will be precisely ejected or retracted prior to the displacement means being retracted.

Another object of the present invention is to provide a plant setter mechanism, as described above, in which detent means are used for holding the link means substantially stationary, at the beginning of the downstroke of the impaling means and for a predetermined range of travel thereof, prior to relative movement of the displacement means. The use of the detent means on the downstroke ensures that internal penetration or insertion of the impaling means into the seedling occurs prior to engagement on its upper surface by the displacement means, thereby resulting in controlled displacement of the seedling from a seedling tray and subsequent deposition in the ground-created furrow.

Another object of the present invention is to provide a combination shoe and plant setter mechanism as described above which contemplates that the shoe will be fixed to a "float" or skid plate and moved therewith, while the plant setter mechanism is mounted on a carriage, enabling the seedling, contained in a seedling tray, to be held stationary relative to the ground during movement of the transplanting machine so that the plant setter mechanism may displace the seedling into the furrow, after which time the soil may be packed around the seedling by means of closure blades provided on the skid plate at the trailing or downstream end of the opener shoe.

These and additional objects and advantages of the present invention will be more readily understood after a consideration of the drawings and the detailed description of the preferred embodiment.

DETAILED DESCRIPTION OF THE PREFERRED EMBODIMENT

The present invention, as mentioned at the outset, is directed to a method and vehicular apparatus operable for the automatic transplanting of seedlings from seedling trays by creating a furrow in the ground, mechanically, and then dislodging a seedling from the tray, displacing it substantially vertically downwardly into the created furrow and holding the seedling upright and stationary while soil is packed therearound. Once the soil packing has taken place, the seedling is released and the cycle repeats. The concept of providing a carriage and one type of plant setter mechanism has been disclosed in pending application Ser. No. 493,992 referred to above. That application disclosed the concept of feeding seedling trays having cells with open bottoms filled with seedlings into a transplanting apparatus, and then ejecting those seedlings by means of a plant setter device into a cavity created in the ground formed by a fluid injector.

Figure 1:
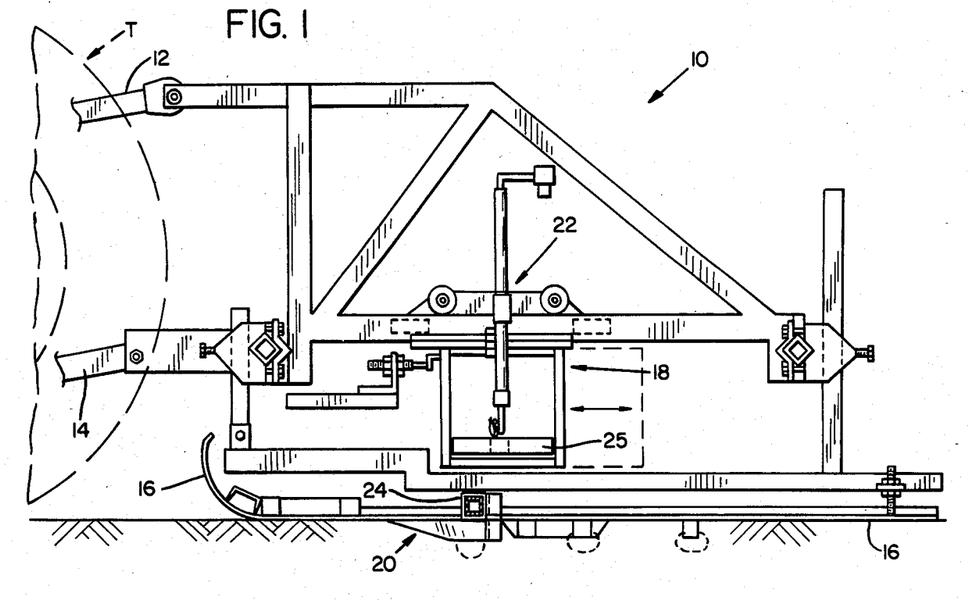
FIG. 1 is a side elevational view of a transplanting vehicular apparatus, shown being pulled behind a tractor (only a portion of which is shown); the ground shown in cross section to illustrate a single opener shoe, mounted on a skid plate, and a single plant setter mechanism operable for controllably displacing a seedling from a seedling tray into the furrow created by the shoe.

Concerning the present invention, a similar type of carriage assembly is mounted on a vehicular frame which is transported across a field by a tractor. However, in the present invention, the soil is continuously opened to create a furrow by a mechanical device, i.e., an opener shoe, and an improved plant setter mechanism, mounted on a shiftable carriage, is operable for displacing a seedling and placing it into the furrow. In general terms, FIG. 1 is a side elevational view of a transplanting apparatus such as a vehicle means indicated at 10, which includes hitch members 12, 14 connected in conventional manner to a tractor T, of which only a portion of a rear wheel is shown. Apparatus 10 includes a plurality of float or skid plates, one of which is indicated at 16. As shown in Ser. No. 493,992, each of the skid plates is dimensioned for movement along the bed of a field in which seedlings are to be transplanted. Thus, if there were eight beds in which seedlings were to be transplanted, there would be eight skid plates, etc.

Additionally, it will be noted in FIG. 1 that a reciprocating carriage means, generally indicated at 18, is mounted on the frame and is operable for shifting from a pre-spot position over an opener shoe 20 to an extended position indicated to the right thereof, during a transplanting sequence which will be described in further detail at a later point. A plant setter mechanism is indicated generally at 22, and includes a fluid-powered cylinder, pneumatically operated, operable for extending and retracting a rod which in turn is connected to components which will also be described later. While only a single opener shoe 20 is shown, it will be appreciated that each skid plate will include at least one opener shoe, which is a mechanical device for creating a furrow in the ground as transplanting apparatus 10 is pulled therealong. As shown in FIG. 1, opener shoe 20 includes a sleeve, indicated at 24, which is slidably received on a tubular member, connected to skid plate 16 so that the opener shoe extends through a slot provided in the skid plate.

Figures 3, 4, 5:
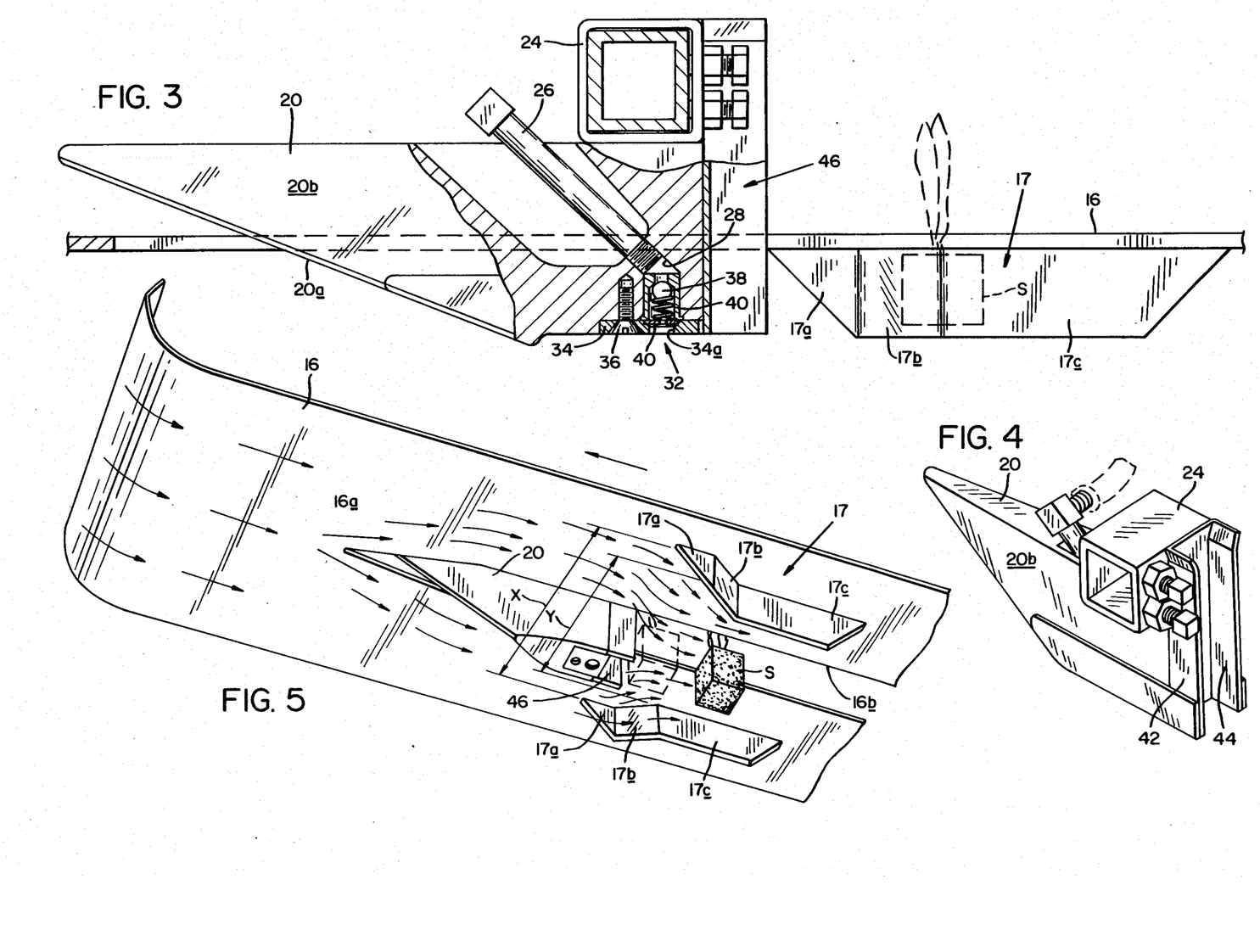
FIG. 3 is an enlarged, isolated view of an opener shoe showing a watering mechanism and soil-packing closure blades associated therewith.
FIG. 4 is a perspective view of the shoe.
FIG. 5 is a view looking up from the ground at a skid plate, showing relative positioning of the opener shoe and closure blades associated therewith for packing soil around the seedling.

More specifically, as shown in FIGS. 3 and 4, opener shoe 20 is of generally triangular form, when viewed in side elevation, and is mounted on skid plate 16 so as to extend through an opening provided therein. As shown in FIG. 5, which is a view looking up toward the bottom of skid plate 16, opener shoe 20 extends through a slot 16a provided in the skid plate. The slot has parallel sides such as indicated at 16b at a downstream position from the rear of the opener shoe. It will also be noted that the bottom of skid plate 16 is provided with soil-packing means 17 operable for redirecting soil from the furrow laterally toward a deposited seedling thereby to pack soil therearound. The soil-packing means is defined by a pair of opposed, spaced-apart closure blades 17a, 17b and 17c, whose operation will be detailed later.

Returning to FIGS. 3 and 4, details of opener shoe 20 will be described. The opener shoe may be thought of as a "plow," and its overall configuration is generally conventional, i.e., it includes a leading edge 20a inclined downwardly and rearwardly which serves to plow or cut the ground into a furrow as the ground is displaced along the sides 20b of the opener shoe. As shown in FIG. 3, a tubular member 26 extends through an opening in the upper surface of the opener shoe and is connected to an inclined bore 28 which transitions into a vertical bore within which is suitably mounted a valve assembly, generally indicated at 32. The valve assembly includes a plate 34 secured via a screw 36 to the opener shoe and a normally closed position by compression spring 40 to block flow of fluid through tubular member 26.

Upon suitable pulsing of liquid under pressure, ball 38 will be moved downwardly and permit water to be directed through a screen 40. Direction of water into the furrow created is advantageous for nourishing deposited seedlings and the sequence of watering will be described when the method of the present invention is set forth. It will also be noted from a viewing of FIG. 4 that opener shoe 20, adjacent its downstream end, is provided with a pair of elongate, upstanding spaced-apart plates 42, 44. The plates function to protect a seedling as it is deposited behind the opener shoe into a furrow, i.e., plates 42, 44, may be thought of as a chute to prevent soil from collapsing onto the seedling during the insertion step, in a manner to be hereinafter described.

Figure 6:
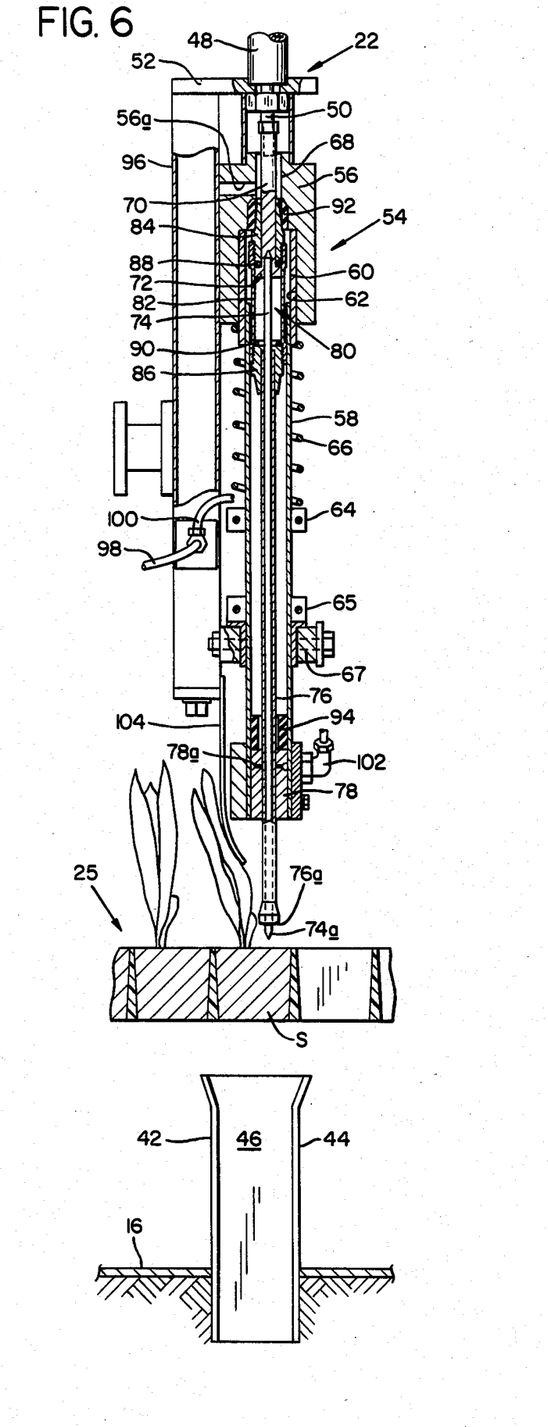
FIGS. 6–10 illustrate, in cross-sectional detail thereof, the plant setter mechanism of the present invention and the sequential steps of dislodging a seedling from a tray and depositing or inserting it into a furrow formed in the ground.

Turning now to a description of plant setter mechanism 22, attention is directed initially to FIG. 6, which shows one of the mechanisms with portions broken away and shown in cross section for purposes of clarity. It will be noted that FIG. 6 depicts plant setter mechanism 22 positioned above seedling tray 25 and also above pocket 46. The other portions of opener shoe 20 have not been shown for purposes of clarity. In any event, the components of plant setter mechanism 22 and its operation will be described, with respect to removing a seedling S from seedling tray 25 and depositing it into the furrow created by the opener shoe. FIGS. 6–10 collectively illustrate the entire sequence of operation.

As shown in FIG. 6, plant setter mechanism 22 includes a fluid-actuated cylinder, such as pneumatic cylinder 48 which is operable to reciprocate an extendable-retractable means such as a rod 50. Pneumatic cylinder 48 is suitably mounted on a bracket 52 which is secured to the carriage means. Extending from the bottom of bracket 52 is a housing, generally indicated at 54, which includes a mounting block 56 from which extends a tubular body or main tube 58 of cylindrical form. Main tube 58 is slidably mounted and secured to a predetermined position within a cylindrical sleeve 60 which is secured within a bore 62 of block 56. Main tube 58 is selectively positionable within sleeve 60 to provide height adjustment relative to the ground, via a clamp 64 and spring 66. A collar 65 is clamped rigidly to the main tube and is supported on a flange portion of a circular bearing which in turn receives the main tube therethrough. The circular bearing is held in place by a block 67 which is secured to the manifold shown to the left.

It will be noted that bore 62 of block 56 includes a transitional bore 68 which accommodates reception downwardly therethrough of an extension rod 70 which is provided with an abutment means 72. Extension rod 70 includes a bore within which is coaxially mounted an impaling means 74 (as by soldering). A distal end of impaling means 74 is provided with a sharpened point 74a. The extendable-retractable means, such as provided by pneumatic cylinder 48 and rod 50, is operable for reciprocally shifting impaling means 74 along its longitudinal axis.

A seedling displacement means is indicated at 76, and is defined by an elongate sleeve dimensioned for coaxially and freely receiving impaling means 74 therethrough. It is to be noted that displacement means 76 is provided with a distal end configured or engaging the upper surface of a seedling. Displacement means 76 is coaxially mounted within main tube 58 and is maintained in substantial vertical alignment by a lower bearing 78 which is secured rigidly to a bottom portion of the main tube.

It is an important objective of the present invention to provide independent movement of the impaling means relative to the displacement means, to penetrate initially and hold the seedling internally, prior to its being shifted downwardly by the displacement means to emerge from beneath the bottom of a seedling tray. To this end, the present invention provides what is referred to as a "link means" generally indicated at 80. The link means is configured for transferring motion from extendable-retractable rod 50 and extension rod 70 to the displacement means only after impaling means 74 has been extended for insertion into the seedling or has been retracted therefrom a predetermined distance. More specifically, as shown in FIG. 6, link means 80 includes a cylindrical body 82 coaxially and slidably received within main tube 58. Threadably secured to opposite ends of cylindrical body 82 are cap elements, such as first cap element 84 and second cap element 86. First cap element 84 has inwardly tapering conical sides, which neck inwardly upwardly, and second cap element 86 has inwardly tapering conical sides directed inwardly in the opposite direction. Also, it is to be noted that the sleeve of displacement means 76 is rigidly secured within and to second cap element 86. Moreover, each of the cap elements is provided with an O-ring cushion, such as indicated at 88 and 90.

The cap elements of the link means cooperate with detent means to provide the aforementioned relative movements between impaling means 74 and displacement means 76. Explaining further, block 56 is provided with a first detent means 92 for holding the link means when it is retracted, and a second detent means 94 is provided for holding the link means when it is extended fully. Second detent means 94 is located adjacent bearing 78, and is a cylindrical elastomeric element as is first detent means 92.

The detent means are provided to maintain displacement means 76 stationary during movement, over a predetermined distance, of impaling means 74. Specifically, as shown in FIG. 6, rod 50 is retracted, and abutment means 72 has engaged, via O-ring 88, first cap element 84 so as to wedge or drive its conically-tapered surface into first detent means 92. The position shown in FIG. 6 may be thought of as a "pre-spot" position, i.e., the position prior to dislodging seedling S from its cell in seedling tray 25 and displacing it downwardly for insertion into the furrow created by opener shoe 20. Viewing FIG. 6, it is to be appreciated that the vehicle means is proceeding into the page, and seedling tray 25 has been indexed to the right to position seedling S directly beneath plant setter mechanism 22. At this point, via a command from a timing mechanism (not shown), pneumatic cylinder 48 is actuated to extend rod 50 downwardly, thereby to move vertically downwardly impaling means 74 into the body or "root ball" of seedling S.

Figure 7:
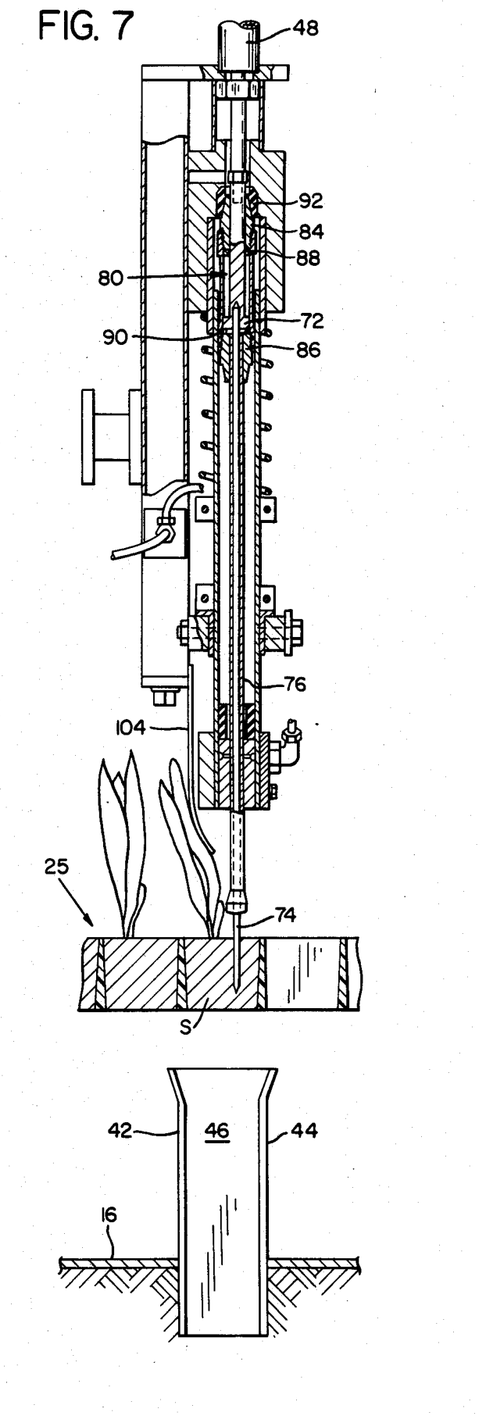
Figure 8:
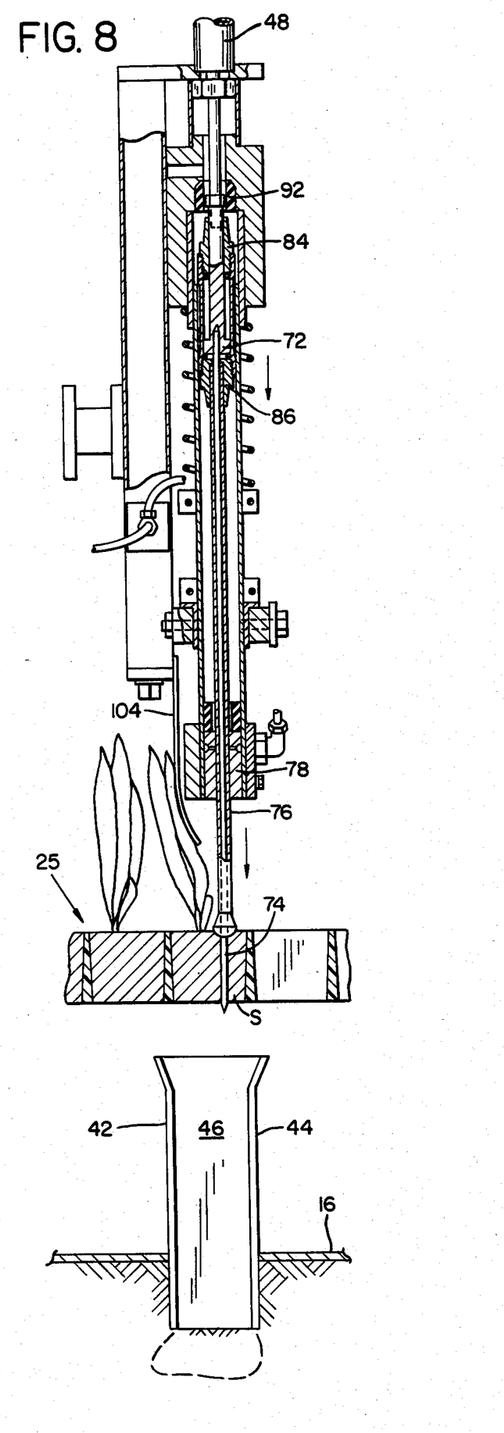

As shown in FIG. 7, rod 50 has been extended downwardly so that extension rod 70 also moves downwardly and abutment means 72 has moved away from engagement with first cap element 84. However, it is to be noted that the first cap element is still wedged within first detent means 92. During the extension of rod 50 to the location shown in FIG. 7, impaling means 74 has been inserted into the body of seedling S. As rod 50 is further extended, abutment means 72 engages second cap element 86, via O-ring 90, and by applying a force to that cap element (roughly in the range of five pounds or thereabouts), link means 80 is urged downwardly so that first cap element 84 is pulled free from the gripping action of first detent means 92. When this occurs, impaling means 74 and displacement means 76 move downwardly simultaneously, into the position shown in FIG. 8, whereby foot 76a of displacement means 76 engages the upper surface of seedling S and impaling means 74 is directed substantially through the depth of the body of the seedling. The impaling means is now in position to hold the seedling internally so that it will be directed substantially vertically by the displacement means.

Figure 9:
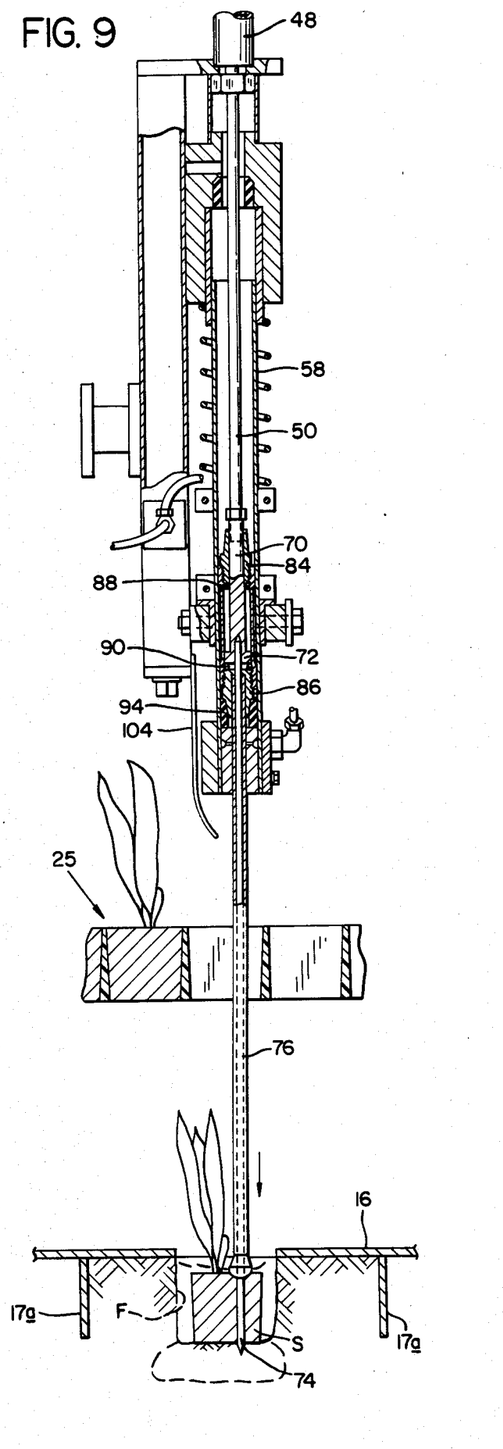
Figure 10:
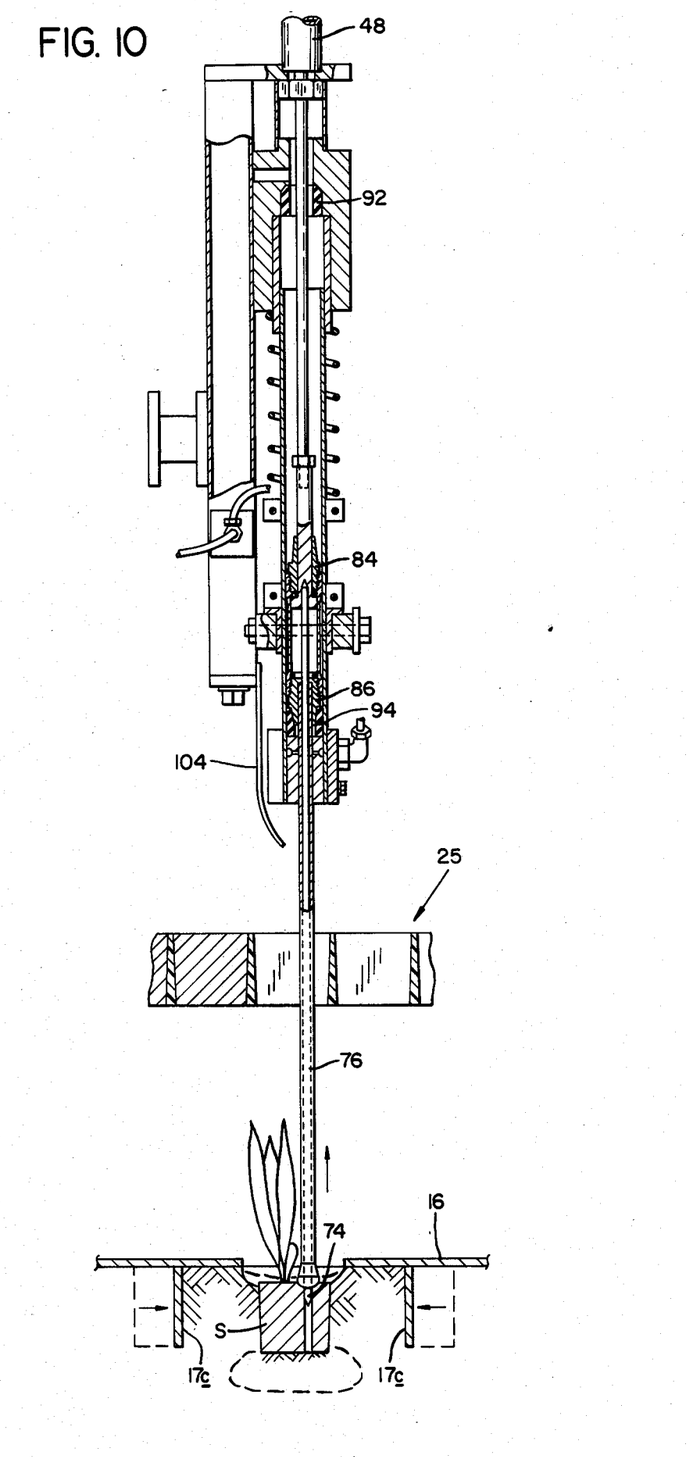

First cap element 84 now has been pulled free from first detent means 92, and abutment means 72 of rod 70 is urged against second cap element 86 so as to apply a force, via displacement means 76, against seedling S, and as shown in FIG. 9, to move the seedling into the furrow F and on to the mud puddle created by introduction of water into the furrow via the mechanism shown in FIGS. 3 and 4. During the movement of seedling S from the position shown in FIG. 8 to that of FIG. 9, it will be appreciated that the seedling is held in a substantially upright position by impaling means 74 as it is being urged downwardly by displacement means 76. There is no way that the seedling can "kick off" to one side or the other, because displacement means 76 is held firmly in vertical alignment by bearing 78 and therefore impaling means 74 is also aligned.

As the seedling is displaced downwardly, it is guided between upright plates 42, 44 for insertion through pocket 46 into the furrow. A controlled and precise displacement of the seedling occurs as it emerges from the bottom of its cell in seedling tray 25 for deposition in the furrow. As shown in FIG. 9, seedling S has been disposed within furrow F, and at this downstroke position, second cap element 86 has been wedged into second detent means 94 by the combined action of rod 50, extension 70 and abutment means 72 pushing against the second cap element. It is an important aspect of the present invention that this second wedging action occur. First, the second wedging decelerates smoothly the downward movement of impaling means 74 and provides a "cushion" so the seedling will not be kicked off by its own momentum at the bottom of the downstroke. Additionally, the second wedging action permits the impaling means to be withdrawn in a positive motion relative to displacement means 76, to "break" its internal hold while pressure is still exerted by the displacement means after soil packing. This will now be explained further.

Once seedling S has been inserted and deposited into furrow F, it is necessary to pack soil around that seedling so that it will be held securely in place. As mentioned at the outset, packing of soil around a seedling may knock it over, however, the impaling means of the present invention holds and maintains the seedling upright while the packing step occurs by soil-packing means 17 (see FIG. 5). The seedling is held upright by the impaling means which extends through the seedling during the entire soil-packing step. As rod 50 is returned on its upstroke, after soil-packing, extension 70 and abutment means 72 also move upwardly, drawing with it impaling means 74 upwardly through seedling S. However, because link means 80, via second cap element 86 and second detent means 94 is stationary, only movement of impaling means 74 occurs until abutment means 72 engages O-ring 88 and first cap element 84. As impaling means 74 is withdrawn upwardly on the upstroke, it is released from its holding engagement with the seedling ("positive ejection") because displacement means 76 holds the seedling firmly in place.

When abutment means 72, on the upstroke of rod 50, strikes first cap element 84 with sufficient force (approximately five pounds), it dislodges or forces second cap element 86 away from its wedged position in second detent means 94. Thereafter, displacement means 76 is retracted upwardly until first cap element 84 is re-wedged in first detent means 92 as shown in FIG. 6. The process is then continuously repeated, with seedling tray 25 being indexed to the right to pre-position a new seedling under plant setter mechanism 22.

To appreciate how the soil is compacted around the deposited seedling, attention is redirected to FIG. 5 which, as will be recalled, is a view looking upwardly at the bottom of skid plate 16. Soil-packing means 17 is defined by opposed, spaced-apart closure blades mounted on skid plate 16 which extend downwardly and vertically therefrom. The closure blades are arranged in opposed pairs, such as indicated at 17a, 17b and 17c, and are positioned for penetration into the ground on opposite sides of the created furrow and on opposite sides of slot 16b as shown in FIG. 5. The closure blades are specifically arranged to redirect loose soil plowed up by the opener shoe and close or compact it around a deposited seedling.

Leading closure blades 17a are spaced apart a distance indicated at X, which may be, in one example, in the range of 7½ inches. Inwardly angled closure blades 17b transition from closure blades 17a to parallel, elongate trailing closure blades 17c. The spacing y between the inside walls of the closure blades 17c may be in the range of 5¾ inches. Thus, as a seedling S, initially shown in dashed lines in FIG. 5, emerges downstream from pocket 46, closure blades 17a serve immediately to direct soil from the created furrow toward closure blades 17b, which in turn, act as a throat or constriction to redirect soil laterally from the furrow toward seedling S to pack soil around that seedling.

Then, as skid plate 16 is further advanced, so that seedling S is positioned downstream as shown in solid outline in FIG. 5, closure blades 17c continue the compaction process. As the seedling moves further downstream, closure blades 17c continue to pack soil into the furrow which is now ahead of the seedling. The idea here is to pack or "jam" soil around the seedling very tightly to hold it firmly in place in the furrow as well as to pack soil into the furrow in advance of and behind a seedling. The flow lines of FIG. 5 replicate generally the flow of the ground and soil particles relative to the bottom of skid plate 16. After complete packing occurs, as mentioned above, impaling means 74 is retracted first and then displacement means 76 in the direction shown in FIG. 10.

To ensure complete compaction, the present invention provides that the width of soil mass continuously moved by the closure blades, represented by the difference between dimensions X and Y, will be greater than the width of the furrow. Thus, if soil is being compacted into the furrow to a dimension greater than the width of the furrow opening, this ensures that complete, tight compaction around a seedling and the furrow will result. Stated another way, if the furrow has a width created by opener shoe 20 of approximately 1⅜ inches, to accommodate a seedling having a width of ¾ inch, then X-Y (7½ inches minus 5¾ inches) will result in soil movement of 1¾ inches in width, which is greater than the furrow width of 1⅜ inches. Thus, soil is being compacted into the furrow resulting in a tightly packed seedling in which air pockets have been eliminated and a tight soil-root ball seal is provided, ensuring that nutrition from the soil and water will start immediately.

Returning to FIG. 6, additional features of plant setter mechanism 22 will be described briefly. It will be noted that a manifold 96 is supported by bracket 52, and serves to transfer low pressure air from a source (not shown) via tube 98 into a port 56a provided in block 56. Air thereby introduced serves to pressurize the system and blow away any foreign particles which may become entrapped in the internal bores of the plant setter mechanism, and it will also be noted that a conduit 100 is provided for channeling low pressure air via a fitting 102 into ports 78a provided in lower bearing 78. Additionally, a deflector 104, fixed relative to seedling tray 25, is mounted so as to extend downwardly from the manifold to gently urge the leaves of a seedling out of the way of impaling means 74 and displacement means 76.

Figure 11:
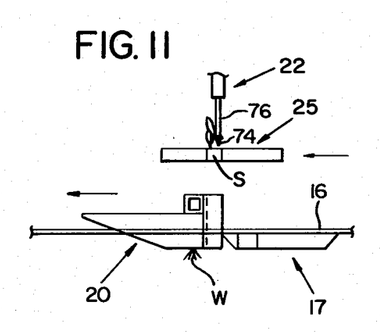
FIGS. 11–16 are simplified views of an opener shoe and a plant setter mechanism, illustrated in sequential steps showing the creation of a furrow and the movement of a seedling from a seedling tray and insertion or depositing it into the ground.
Figure 12:
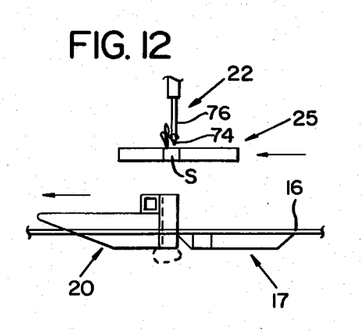

As a final summarizing overview of the sequence of steps of the method and apparatus of the present invention, attention is directed to FIGS. 11-16, which show in schematic diagrams the relationship of plant setter mechanism 22, seedling tray 25 and opener shoe 20. Initially, as shown in FIG. 11, the carriage means is retracted forwardly so that the cell holding a seedling to be deposited is positioned over pocket 46 of opener shoe 20. In that initial position, plant setter mechanism 22 is in its pre-spot position, i.e., impaling means 74 and displacement means 76 are fully retracted as shown in FIG. 6 of the drawings. Opener shoe 20 is continuously creating a furrow, and according to a timed sequence, water, indicated at W, is injected via tubular member 26 (see FIG. 3 also) through valve at 32 into the ground. Next, as shown in FIG. 12, as opener shoe 20 continues downstream, pocket 46 and seedling tray 25 become positioned over the mud puddle created in the furrow by the water injection.

Figure 2:
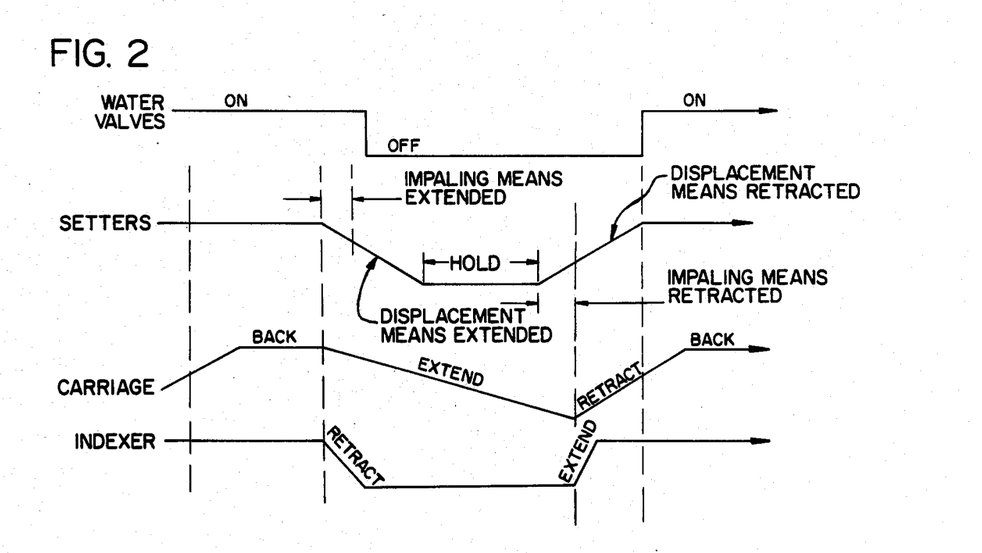
FIG. 2 is a diagram of various cycles showing operation of water valves, plant setter mechanisms, etc.
Figure 13:
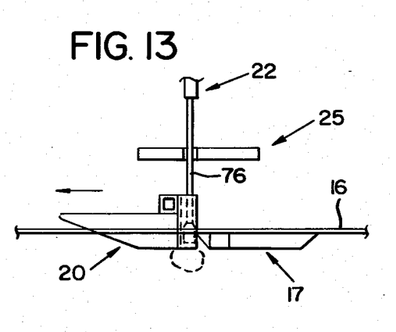
Figure 14:
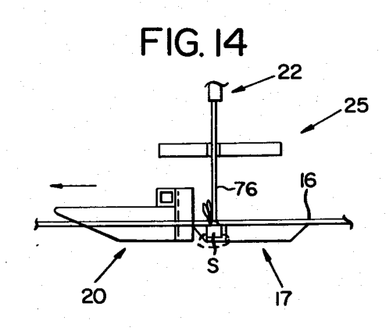
Figure 15:
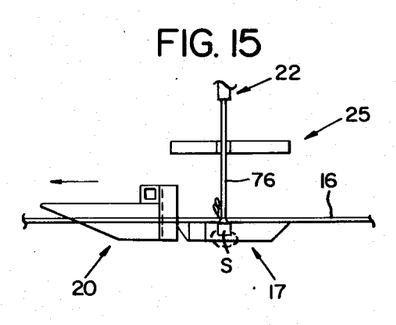
Figure 16:
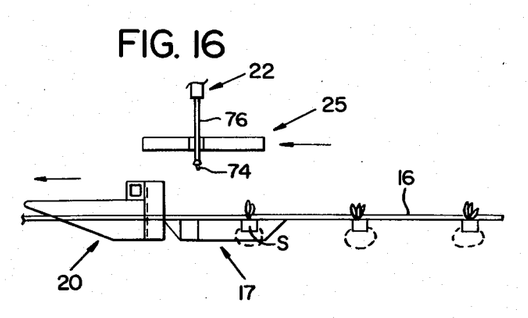

As shown in FIG. 13, plant setter mechanism 22 is actuated in the series of steps shown in FIGS. 6-9 so as to controllably deposit and insert the seedling into pocket 46 behind opener shoe 20. Simultaneously with this action, the carriage means has been extended rearwardly (see FIG. 2) at a rate equal to the rate of forward travel of the transplanting apparatus. It is necessary for the carriage means to be extended rearwardly because it must be stationary, relative to the ground, in order to preposition the seedling on the wet soil. In essence, plant setter mechanism 22 and the carriage means are at "zero" ground speed, and as shown in FIGS. 14 and 15, seedling S, with the carriage means still being extended rearwardly, is held in the furrow upright by the impaling means while the closure blades pack soil around the seedling (see also FIG. 2 for a diagram of the relative action of the plant setter mechanism and the carriage means).

With the seedling fully deposited in the furrow and soil packed therearound (FIG. 16), and with further forward motion of the transplanting apparatus and opener shoe 20, the carriage means is retracted forwardly to the pre-spot position in FIG. 11, and the plant setter mechanism is actuated to retract the impaling means and the displacement means. The seedling tray is then indexed (into the plane of the paper of FIG. 16) so that a new seedling tray cell is positioned beneath plant setter mechanism 22 as shown in FIG. 6.

The method and apparatus as above described is particularly advantageous from several significant standpoints. First of all, by combining an opener shoe with a plant setter mechanism incorporating the features described above, a positive, controlled ejection of a seedling from a seedling tray and into the ground is ensured. By providing a plant setter mechanism which is operable for moving the impaling means, relative to the displacement means in stages, controlled internal holding of the seedling initially occurs by penetration of the impaling means thereinto, followed by concurrent downward motion of the displacement means to displace the seedling from the bottom of a seedling tray. The relative motion is created by the use of the link means and detent means as above described.

The "detent" action provides for initial movement of the impaling means until relative movement between the impaling means and the displacement means is taken up, thereafter first cap element 84 is forced downwardly and disengaged from its wedging action with first detent means 92 so that the impaling means and displacement means move downwardly together. It is this controlled insertion, together with the critical step of holding the seedling firmly in an upright position by the impaling means, during the packing of soil therearound, that makes the plant setter mechanism of the present invention so important. After the soil has been packed around, relative motion of the impaling means is provided to first break the internal seal or hold which the impaling means has with the seedling, and this is accomplished by its being retracted through the displacement means, which remains stationary.

In addition, the detent means, such as first detent means 92 and second detent means 94 serve to cushion action of the up and downstroke movements.

While the present invention has been shown and described with reference to the foregoing preferred embodiment, it will be apparent to those skilled in the art that other changes in form and detail may be made without departing from the scope and spirit of the invention as defined in the appended claims.

It is claimed and desired to secure by Letters Patent:

1. A method for transplanting a seedling plug into the ground of a field comprising:
    creating a furrow in the ground;
    holding the seedling plug internally by inserting an impaling means into the seedling plug and while so holding the plug displacing it in a substantially vertical orientation into the furrow;
    maintaining the seedling plug by the internal hold substantially vertical in the furrow;
    directing and packing soil around the vertically maintained seedling plug thereby to plant it in the furrow; and
    releasing the internal hold on the seedling plug.

2. The method of claim 1 wherein the inserting step is accomplished by extending the impaling means through the upper surface of the seedling plug.

3. The method of claim 2 wherein the displacement step includes engaging the upper surface of the seedling plug and pushing it substantially vertically downwardly into the furrow.

4. The method of claim 3 wherein the inserting step occurs along a longitudinal axis substantially coaxial with the longitudinal axis defined by the downward vertical movement of the displacement step.

5. Apparatus for automatically transplanting seedling plugs from cells in a seedling tray having open bottoms into a crop row in the ground of a field comprising:
    vehicle means operable for travel over the field;
    opener means for creating a seedling plug-receiving furrow in the ground;
    carriage means mounted on the vehicle means for receiving the seedling tray;
    plant setter mechanism operable for controllably displacing a seedling plug from the seedling tray and depositing it in the furrow, the plant setter mechanism including an elongate impaling means dimensioned for insertion through the upper surface of the seedling plug to hold it internally and shiftable to extend into a furrow produced by said opener means, the plant setter mechanism also including displacement means for displacing the seedling plug by moving the seedling plug along said impaling means into the furrow; and
    soil-packing means mounted on the vehicle means operable for laterally redirecting soil from the furrow toward a deposited seedling plug so as to pack soil therearound.

6. The apparatus of claim 5 wherein the opener means includes a protective pocket for receiving the seedling plug as it is displaced and deposited into the furrow.

7. The apparatus of claim 6 wherein the soil-packing means includes opposed, spaced-apart blades extending into the ground, on opposite sides of the furrow, configured for redirecting and closing soil toward the deposited seedling plug.

8. The apparatus of claim 7 wherein the blades include portions which are placed at an angle relative to the direction of travel of the vehicle means to thereby form a constriction.

9. Plant setter mechanism operable for controllably displacing a seedling plug from a first location and depositing it at a second location comprising:
    elongate reciprocally mounted impaling means dimensioned for insertion into the seedling plug;
    seedling plug displacement means including an elongate reciprocally mounted sleeve disposed coaxially about the impaling means and freely receiving the impaling means with the impaling means extending through the sleeve, the displacement means further having a distal end configured for engaging the upper surface of the seedling plug;
    extendable-retractable means operable to shift the impaling means in one direction whereby such extends from the displacement means and then to shift the impaling means in the opposite direction whereby the impaling means retracts toward the displacement means; and
    link means for transferring motion from the extendable-retractable means to the displacement means whereby the displacement means is shifted to follow the impaling means after the impaling means has been extended a predetermined distance and is shifted to follow the impaling means after the impaling means has been retracted a predetermined distance.

10. The plant setter mechanism of claim 9 further including a housing for slidably receiving the link means, said link means being rigidly connected to the displacement means.

11. The plant setter mechanism of claim 10 wherein the housing is provided with a first detent means for holding the link means when it is retracted, and a second detent means for holding the link means when it is extended fully.

12. The plant setter mechanism of claim 11 wherein the first detent means is defined by a first elastomeric means deformable for receiving and gripping an upper end of the link means, and wherein the second detent means is defined by a second elastomeric means opposed from the first elastomeric means deformable for receiving and gripping the lower end of the link means.

13. The plant setter mechanism of claim 12 wherein the upper end of the link means is defined by a first cap element wedgeable in the first detent means, the lower end of the link means also being defined by a second cap element wedgeable in the second detent means.

14. The plant setter mechanism of claim 13 wherein each cap element is formed with sides tapering inwardly toward its associated detent means.

15. The plant setter mechanism of claim 13 wherein the housing includes an elongate main tube, and wherein the link means is defined by a cylindrical member slidable mounted within the main tube.

16. The plant setter mechanism of claim 15 wherein the extendable-retractable means is defined by a rod element dimensioned for coaxial and slidable reception within a bore provided in the first cap element.

17. The plant setter mechanism of claim 16 wherein the rod element of the extendable-retractable means is provided with an abutment means configured for engaging the second cap element on a downstroke, after the extendable-retractable means has shifted the impaling means downwardly a predetermined distance, and thereby urging the first cap element away from the first detent means so that completion of the downstroke results in the second cap element being wedged into the second detent means.

18. The plant setter mechanism of claim 17 wherein the main tube includes a bearing adjacent the second detent means for maintaining the displacement means in substantially vertical alignment.

19. The plant setter mechanism of claim 18 wherein the abutment means is configured for engaging the first cap element to move it toward the first detent means, on an upstroke, and thereby urge the second cap element away from the second detent means.

20. The plant setter mechanism of claim 19 wherein the cap elements have facing surfaces which are spaced apart a distance substantially equal to the distance through which the impaling means may penetrate the seedling plug.

21. The plant setter mechanism of claim 20 wherein a seedling leaf structure joins with the seedling plug, and further including deflection means for positioning the leaf structure to one side of the impaling means.

22. The plant setter mechanism of claim 21 further including height adjustment means for selectively varying the main tube relative to the ground.

* * * * *